(12) United States Patent
Samuel et al.

(10) Patent No.: US 12,524,381 B2
(45) Date of Patent: Jan. 13, 2026

(54) DATA COLLECTION OPTIMIZATION FOR INPUT/OUTPUT ACCESS HANDLING

(71) Applicant: DELL PRODUCTS L.P., Round Rock, TX (US)

(72) Inventors: Balasingh Samuel, Round Rock, TX (US); Nikhil Vichare, Austin, TX (US); Farzad Khosrowpour, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/608,438

(22) Filed: Mar. 18, 2024

(65) Prior Publication Data

US 2025/0291771 A1 Sep. 18, 2025

(51) Int. Cl.
*G06F 16/21* (2019.01)

(52) U.S. Cl.
CPC .................. *G06F 16/211* (2019.01)

(58) Field of Classification Search
CPC .................................. G06F 16/211
USPC ..................................... 707/736
See application file for complete search history.

(56) References Cited

U.S. PATENT DOCUMENTS

| | | | |
|---|---|---|---|
| 7,472,182 B1 * | 12/2008 | Young | H04L 67/1097 709/227 |
| 2008/0222096 A1 * | 9/2008 | Ungureanasu | G06F 16/244 |
| 2012/0198050 A1 * | 8/2012 | Maki | H04L 43/04 709/224 |
| 2015/0032536 A1 * | 1/2015 | Thomas | G06Q 30/0255 705/14.53 |
| 2020/0034051 A1 * | 1/2020 | Zhang | G06F 3/065 |
| 2020/0225655 A1 * | 7/2020 | Cella | G06F 18/2178 |
| 2020/0356694 A1 * | 11/2020 | Lee | H04L 9/3263 |
| 2021/0192867 A1 * | 6/2021 | Fang | G07C 5/0816 |
| 2022/0237061 A1 | 7/2022 | Sethi et al. | |
| 2022/0358025 A1 | 11/2022 | Dattatri et al. | |
| 2022/0377149 A1 | 11/2022 | Vichare et al. | |
| 2023/0087829 A1 | 3/2023 | Ponnuru et al. | |
| 2023/0142028 A1 * | 5/2023 | Cheng | H04L 43/16 709/224 |
| 2023/0216666 A1 | 7/2023 | Harwood et al. | |
| 2023/0260336 A1 * | 8/2023 | Nishie | G07C 5/085 701/33.4 |

FOREIGN PATENT DOCUMENTS

EP 3700135 A1 * 8/2020 ......... H04L 41/0894

* cited by examiner

*Primary Examiner* — Kuen S Lu
(74) *Attorney, Agent, or Firm* — Larson Newman, LLP

(57) ABSTRACT

An information handling system determines a data collection frequency according to a data collection policy, wherein the data collection frequency is based on a data type of the data to be collected and a data collection interface. The system collects the data according to the data collection frequency associated with the data type of the data and the data collection interface, and transmits the data to a requesting information handling system.

20 Claims, 5 Drawing Sheets

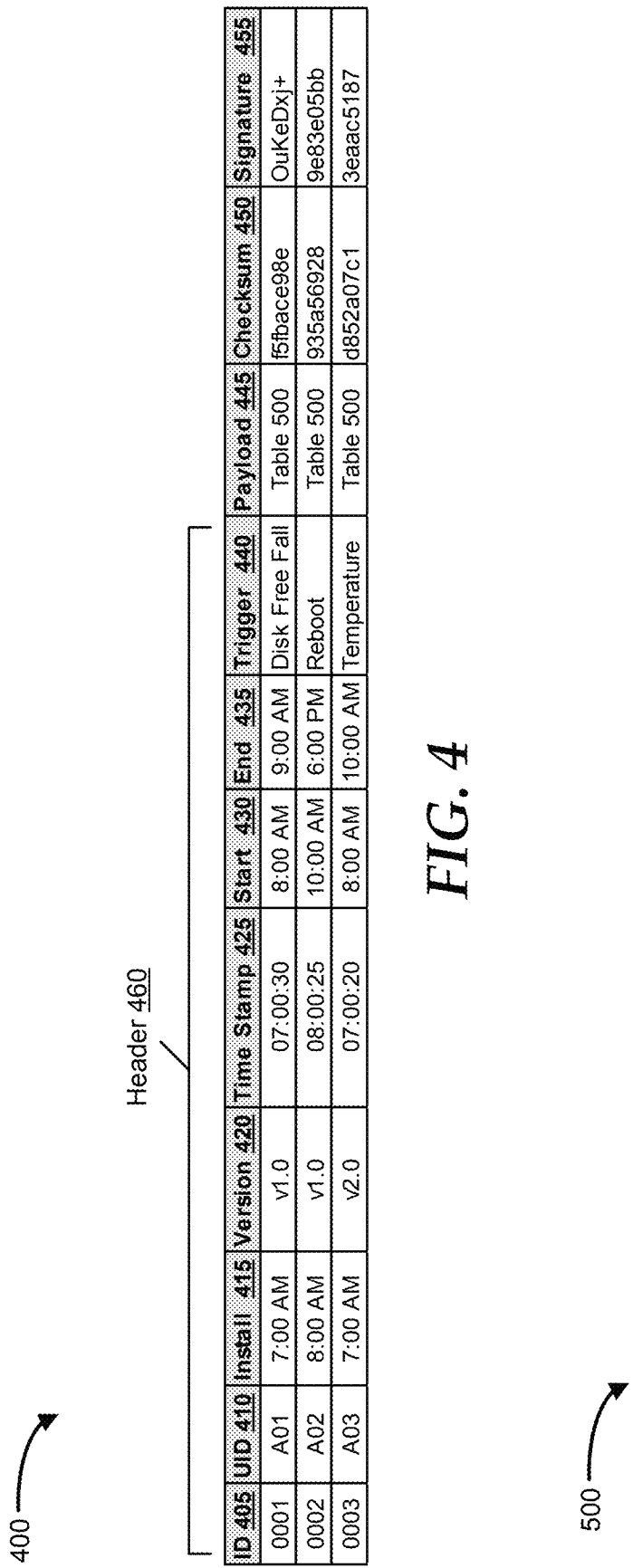

| Data Type 505 | Data 610 | Collection Frequency 510 | Interface 620 | Element 625 |
|---|---|---|---|---|
| Fan Speed | 3500,3610 | 120 | SMI | |
| Battery | XYZ | 600 | SMI | |
| Skin Temperature | 90,81,92 | 90 | I2C | |

| Data Type 505 | Data 710 | Collection Frequency 510 | Interface 720 | Element 725 |
|---|---|---|---|---|
| Fan Speed | 4040,3090 | 20 | I3C | |
| Battery | XYZ | 600 | SMI | |
| Skin Temperature | 103,100, 82 | 90 | I2C | |

| Data Type 505 | Data 810 | Collection Frequency 510 | Interface 820 | Element 825 |
|---|---|---|---|---|
| Fan Speed | 3010,3300 | 30 | IO | |
| Battery | XYZ | 600 | TZ | |
| Skin Temperature | 92, 100, 99 | 90 | IO | |

DATA COLLECTION OPTIMIZATION FOR INPUT/OUTPUT ACCESS HANDLING

FIELD OF THE DISCLOSURE

The present disclosure generally relates to information handling systems, and more particularly relates to data collection optimization for input/output access handling.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system determines a data collection frequency according to a data collection policy, wherein the data collection frequency is based on a data type of the data to be collected and a data collection interface. The system collects the data according to the data collection frequency associated with the data type of the data and the data collection interface, and transmits the data to a requesting information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4 is a table of a schema of a data collection policy, according to an embodiment of the present disclosure;

FIG. 5 is a table of a payload for a data collection policy, according to at least one embodiment of the present disclosure; and FIGS. 6-8 are tables of data collected from compute devices, according to at least one embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
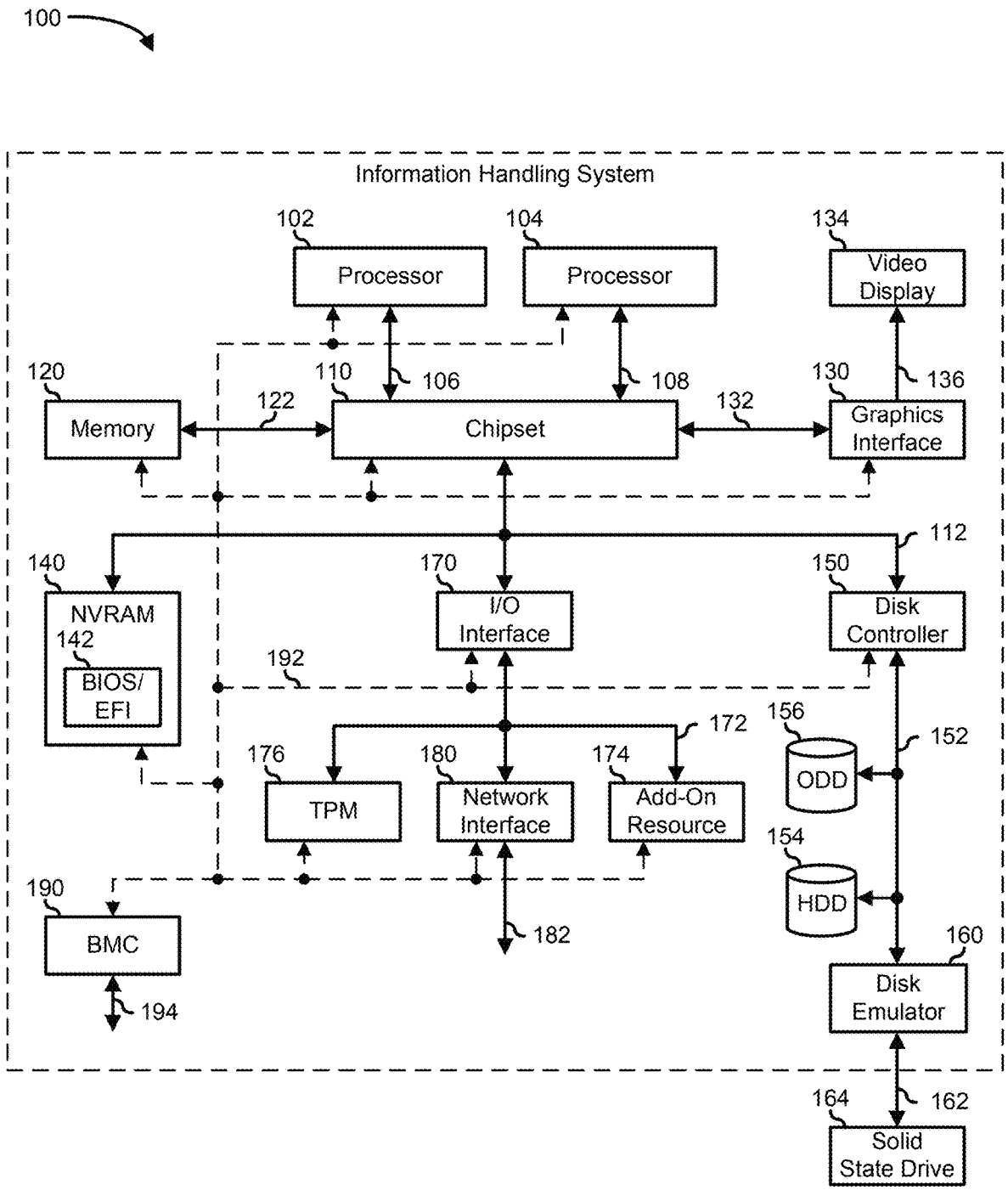
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NVRAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NVRAM 140, disk controller 150, and I/O interface 170 are connected to chipset 110 via an I/O channel 112. An example of I/O channel 112 includes one or more point-to-point PCIe links between chipset 110 and each of NVRAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NVRAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (IDRAC).

Management interface 192 represents one or more out-of-band communication interfaces between BMC 190 and the elements of information handling system 100, and can include an Inter-Integrated Circuit (I2C) bus, a System Management Bus (SMBus), a Power Management Bus (PMBus), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, and transfers the firmware updates to the NVRAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NVRAM associated with the BMC. Information stored in the RAM may be lost after power-down of the power plane for BMC 190, while information stored in the NVRAM may be saved through a power-down/power-up cycle of the power plane for the BMC.

Information handling system 100 can include additional components and additional buses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Information technology (IT) administrators or cloud-level microservices manage a large fleet of endpoint systems and/or devices. Typically the fleet consists of multiple generations of computers with multiple SoCs, hardware with multiple firmware, and access interfaces. For example, one system may have a different BIOS version than another system. The interfaces and methods to instrument the data greatly vary concerning speed, complexity, access methods, latency, etc. For example, a system management interface (SMI) is slower than a memory-mapped I/O (MMIO) interface. Accordingly, the frequency used for collecting the data may be different for the SMI and the MMIO interfaces.

Building intelligent solutions to manage and/or control the fleet, such as workload optimization, recommenders, remediation, predictive health assessment, etc., requires periodic collection of several subsystem data sets. For each intelligent solution the type of data, data collection frequency, start time, end time, trigger point, duration, data budget, etc., may be varied based on its use cases. In addition when an issue occurs in one of the systems and devices, an IT administrator may also have to collect data to determine and resolve the issue. To do this, the IT administrators typically create a data collection policy for each one of the systems and devices with an issue, wherein the data collection policy provides information on what data to collect and at what frequency.

Because each one of the endpoint systems and devices may have different architectures, the IT administrator may have to create a data collection policy for each one. This process may not be scalable to create a data collection policy for each one of the systems and devices when the IT administrator is managing hundreds or thousands of systems and/or devices. To address these and other concerns, an intelligent and dynamic data collection method is provided by the current disclosure to support different system architectures to effectively collect data based on the system architecture.

Figure 2:
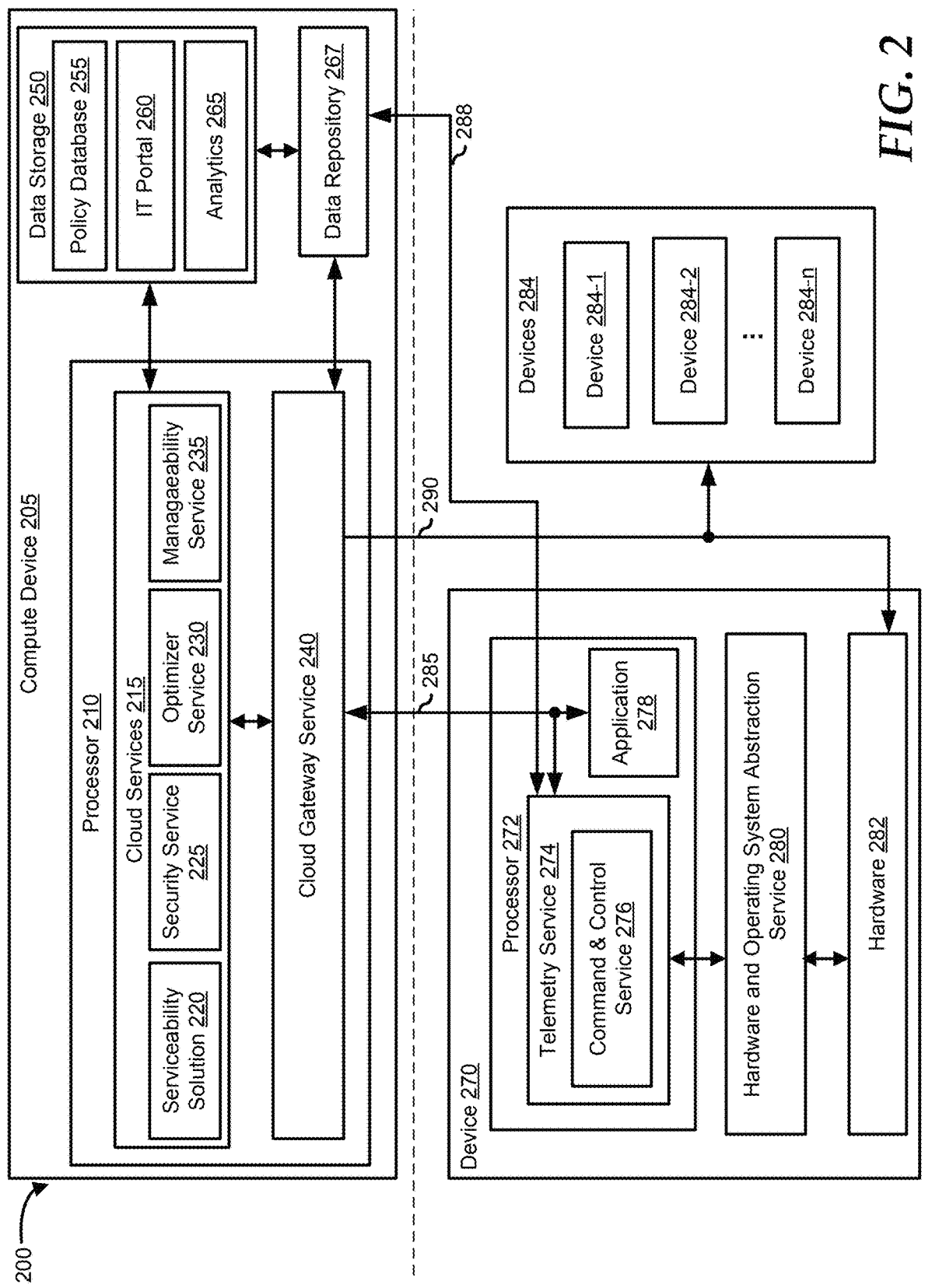
FIG. 2 is a block diagram of a telemetry system, according to an embodiment of the present disclosure.

FIG. 2 shows a telemetry system 200 including a compute device 205 and a device 270, according to at least one embodiment of the present disclosure. Compute device 205, which is similar to information handling system 100 of FIG. 1, may be any suitable device external to compute device 205, such as a dedicated compute server, a remote cloud server, or the like. Compute device 205 includes a processor 210, a data storage 250, and a data repository 267. Device 270 can be any suitable device, such as a compute device, an edge device, an edge compute device, and an information handling system that is similar to information handling system 100 of FIG. 1, or the like. Device 270 includes a processor 272, hardware and operating system abstraction service 280, and hardware 282. Devices 284 includes device 284-1 through device 284-n. Each one of devices 284-1 through 284-n may include components similar to device 270. For example, each one of devices 284 includes a processor that includes a telemetry service and an application. In addition, connections between components may be omitted for descriptive clarity.

Compute device 205 may be communicatively coupled to device 270 via one or more interfaces, such as via a control lane 285, a data lane 288, and an API lane 290. Compute device 205 may also be communicatively coupled to device 270 via a network, which can be a public network, such as the Internet, a physical private network, a wireless network, a virtual private network, or any combination thereof. Devices 284 may be similarly communicatively coupled to compute device 205. However, any variety of connections between compute device 205, device 270, and devices 284 are envisioned as falling within the scope of the present disclosure.

Processor 210 includes cloud services 215 and a cloud gateway service 240. Cloud services 215 include one or more solutions, such as serviceability solution 220. Cloud services 215 also include microservices, such as a security service 225, an optimizer service 230, and a manageability service 235. Each of the microservices can run its process and can communicate with other systems or services through a lightweight mechanism, such as a hypertext transport protocol (HTTP) resource API or communication API provided by an external system. In some embodiments, microservices are small independent, and composable services that can be accessed through representational state transfer APIs. Thus, a single monolithic application may be broken down into separate independent microservices for discrete functions. For example, security service 225 may be configured to build the data collection policy that includes data collection rules and grammar that may be used to collect data to identify and/or address security vulnerabilities associated with a specific endpoint device.

Optimizer service 230 may be configured to optimize the data collection while manageability service 235 may be used to tune and/or manage the data collection policy along with the data collection rules, and grammar. For example, manageability service 235 may be used to view, edit, update, cancel, and/or delete the data collection policy with the data collection rules and/or grammar by a user and/or an application. Serviceability solution 220 may be configured to identify and address serviceability concerns of various information handling systems, subsystems, and/or devices, such as device 270. In addition, serviceability solution 220 may be configured to deploy or install the data collection policy in device 270 via cloud gateway service 240 through control lane 285 or API lane 290. Cloud gateway service 240 may be configured to provide connectivity between compute device 205, device 270, and devices 284. In this example, cloud gateway service 240 may be a software-based appliance. However, in another embodiment, a hardware-based appliance. Control lane 285 may be wired or wireless I/O lanes that are configured to transmit the data collection policy, such as $I^2C$, SMBus, or similar. Other policies, commands, and/or instructions may also be transmitted via control lane 285.

A cloud service or an application, such as cloud services 215 and application 278 respectively, may be configured to create or build a data collection policy that is common or applicable to different data sources. The data collection policy may include one or more data collection rules that are based on a schema published by a telemetry service. In another embodiment, the schema may be provided to a user via IT portal 260. When the telemetry service publishes an update to the schema or publishes a new schema, the cloud service and/or an administrator can update the data collection rules and grammar. A data collection grammar may be used to invoke one or more data collection rules. In one embodiment, the data collection grammar may include function invocations, parameter values, Boolean expressions, etc. that can fit into a statement that may be used in triggering, executing, or applying the data collection rules.

The data collection rules and associated data collection grammar may be built by a user statically or created heuristically by machine learning/artificial intelligence, or any combination thereof. In certain examples, the data collection rules may be any suitable rule to control or set up how data is collected from different components, subsystems of an information handling system, or devices, such as devices 270 and 284. For example, the data collection rules may include but not limited to, times of day to collect the data, the components for data collection, and an interval for the data collection. The data collection rules and grammar may be built or generated to target a specific endpoint device. For example, cloud services 215 may generate a data collection policy that includes a data collection rule and grammar to collect telemetry data from device 270.

An example of a data collection rule is to collect CPU junction temperature from 8:00 AM to 10:00 AM every 10 seconds. The rule may also be configured to run when triggered by an event associated with the insertion or removal of a component or device. In addition, the rule may be configured to collect data associated with fan speed every 30 seconds, etc. Another data collection rule may be configured to collect one or more data sets for five minutes when the CPU temperature reaches 95 degrees centigrade and stays at that temperature for 20 seconds. The data sets to be collected may include memory usage and memory temperature every 10 seconds. The data sets to be collected may also include self-monitoring analysis, and reporting (SMART) technology data associated with one or more data storage devices, such as an HDD, an ODD, a SSD, or similar. In addition, the data sets to be collected may also include total system power data with alternating current and battery status every 30 seconds. Yet another data collection rule may be configured to read system inventory when a free fall event of a data storage or the information handling system is detected.

A telemetry service may be configured to collect and/or receive data from one or more sources and transmit the data to a local or remote data repository. The sources include devices, subsystems, components, peripherals, etc. For example, telemetry service 274 may be configured to collect from devices 270 and 284. Command and control service 276 may be configured to manage and/or control one or more data collection policies. Command and control service 276 may be configured to generate, manage, and control a schema, such as depicted in table 500 of FIG. 5, for the data collection policy. For example, a user or an application, such as application 278 may update, edit, or delete the schema.

Application 278 may be configured to generate the data collection policy, similar to cloud services 215. Hardware and operating system abstraction service 280 may be configured as a physical resources abstraction layer for hardware 282 to telemetry service 274 via command and control service 276. In one example, hardware and operating system abstraction service 280 may be a firmware or device driver associated with hardware 282.

Cloud gateway service 240 may be configured to provide connectivity between compute device 205, device 270, and devices 284. In this example, cloud gateway service 240 may be a software-based appliance. However, in another embodiment, a hardware-based appliance. Control lane 285 may be wired or wireless I/O lanes that are configured to transmit the data collection policy, such as $I^2C$, SMBus, or similar. Other policies, commands, and/or instructions may also be transmitted via control lane 285 or API lane 290.

The telemetry service, such as telemetry service 274, may receive the data collection policy that includes one or more data collection rules and grammar via a command and control service through a control lane. For example, telemetry service 274 may receive collection data created by cloud services 215 and/or application 278 via command and control service 286 through control lane 285 or API lane 290. Upon receipt of the data collection rule and grammar from the cloud service, the telemetry service may decode the data collection grammar. Decoding the data collection grammar may include parsing the grammar and breaking the sentence. Afterward, the telemetry service may process the data collection rule and collect telemetry data from one or more sources based on a schedule and/or trigger defined in the data collection rule.

The data collection may be automatically defined based on the system architecture of the device or information handling system. For example, if the telemetry service is using an SMI to read smart battery data, then the telemetry service may collect the data at a corresponding data frequency, also referred to as a data tolerance, associated with the SMI are utilized, such as depicted in a table 500 of FIG. 5. In another example, if the telemetry service is using memory mapped I/O (MMIO) to read or collect data from a peripheral device, such as hardware 282, then the telemetry service may collect the data according to its corresponding frequency in table 500. In yet another example, if the system architecture is using an $I^2C$ or an improved inter-integrated circuit ($I^3C$), then the corresponding data frequency associated with $I^2C$ or $I^3C$ is utilized respectively.

After the telemetry service has collected the data, the telemetry service may store the collected data in a local data storage or a data lake, such as data repository 267. The local data storage may be a data store or a database. In another example, the telemetry service may store the telemetry data in an on-the-box application, such as application 278. The stored telemetry data may be labeled accordingly after the collection prior to storage. The telemetry service may use the data lane, such as data lane 288, to transmit the telemetry data to the remote data storage. For example, telemetry service 274 may store the collected data at data repository 267 using data lane 288. Data lane 288 may be a wired or wireless I/O lane that is configured to transmit data, such as a DisplayPort™, USB, etc. The location where the telemetry data may be transmitted and stored may be based on a data collection rule associated with the telemetry data.

Data storage 250 includes policy database 255, IT portal 260, and analytics 265. Policy database 255 may be used to store the data collection policy along with the data collection rules and grammar. Analytics 265 may be used to analyze the data collected and stored in data repository 267. IT portal 260 may be used by a user, such as an administrator or an application to manage collected data and/or the data collection policy. Data storage 250 and data repository 267 may be persistent data storage devices such as solid-state disks, hard disk drives, magnetic tape libraries, optical disk drives, magneto-optical disk drives, compact disk drives, compact disk arrays, disk array controllers, and/or any computer-readable medium operable to store data.

Data repository 267 may be configured as a data lake, a data warehouse, or similar for storage of data collected from one or more sources, such as information handling systems and/or its subsystems, devices, etc. For example, data collected from device 270 and devices 284 may be stored in data repository 267 via data lane 288. The data may be stored in various formats, such as its natural or raw format, or a structured or semi-structured format. In addition, the data may be labeled prior to the storage. The data may be used for machine learning, analytics, and/or reporting. Data repository 267 may be a persistent storage device similar to data storage 250.

The operations described herein as being performed by cloud services 215 and cloud gateway service 240 may be performed or executed by processor 210. Similarly, processor 272 may perform any suitable operations to execute telemetry service 274 and/or application 278. The term "user" in this context should be understood to encompass, by way of example and without limitation, a user device, a person utilizing or otherwise associated with the device, or a combination of both. An operation described herein as being performed by a user may therefore be performed by a user device, or by a combination of both the person and the device.

Those of ordinary skill in the art will appreciate that the configuration, hardware, and/or software components of telemetry system 200 depicted in FIG. 2 may vary. For example, the illustrative components within telemetry system 200 are not intended to be exhaustive but rather are representative to highlight components that can be utilized to implement aspects of the present disclosure. For example, other devices and/or components may be used in addition to or in place of the devices/components depicted. In particular, instead of collecting data from a device as shown, other sources of data may be used instead, such as subsystems and other components. The depicted example does not convey or imply any architectural or other limitations with respect to the presently described embodiments and/or the general disclosure. In the discussion of the figures, reference may also be made to components illustrated in other figures for continuity of the description.

Figure 3:
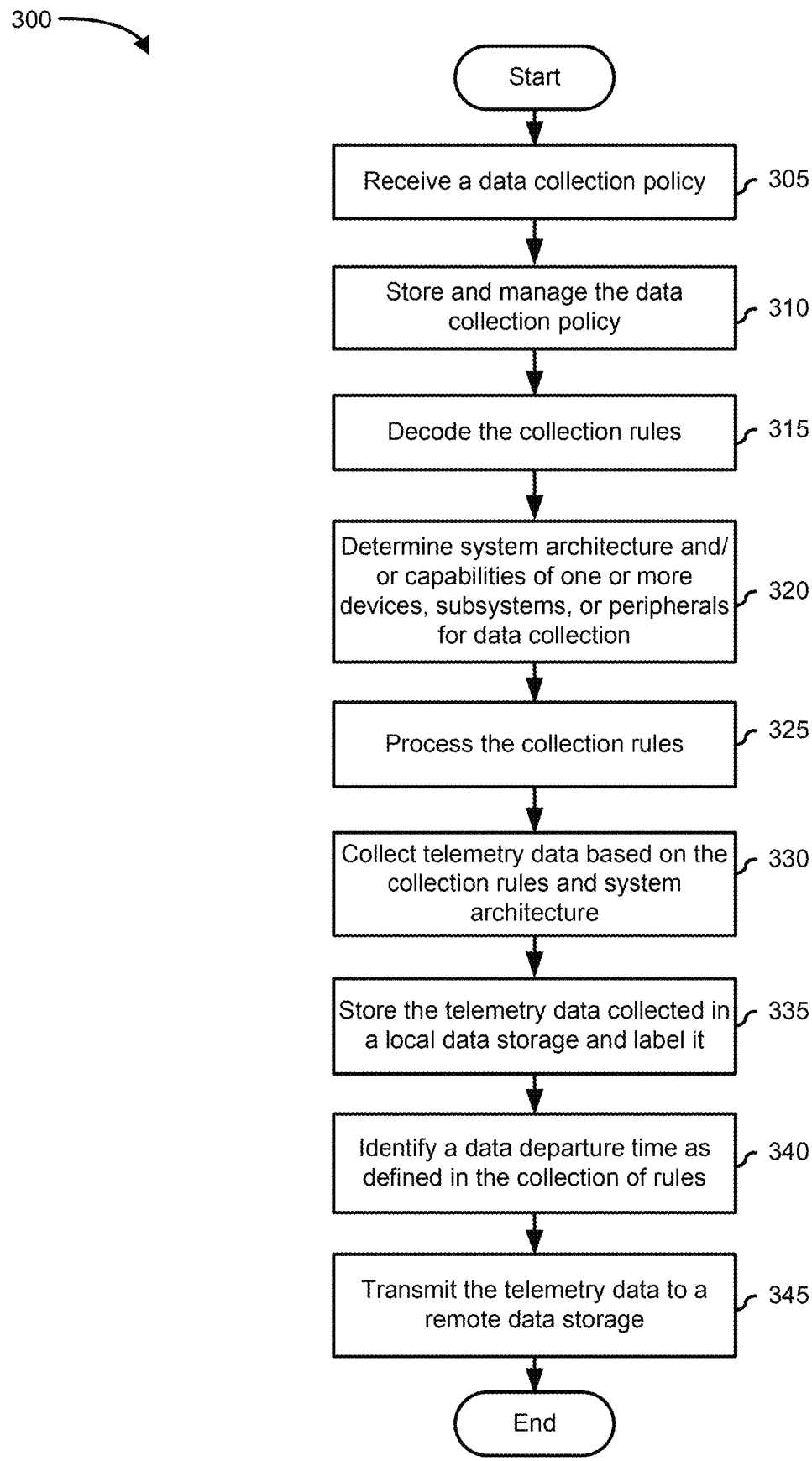
FIG. 3 is a flowchart of a method for data collection optimization for input/output access handling, according to an embodiment of the present disclosure.

FIG. 3 shows a flowchart of a method 300 for data collection optimization for input/output access handling. Method 300 may be used to automatically modify data collection frequency based on platform architecture, such as type of SOCs, I/O access interface, BIOS version, etc. Method 300 may be performed by any suitable component of compute device 205 and device 270 of telemetry system 200 of FIG. 2 including, but not limited to cloud services 215 and telemetry service 274. While embodiments of the present disclosure are described in terms of the components of telemetry system 200 of FIG. 2, it should be recognized that other components may be utilized to perform the described method.

Method 300 typically starts at block 305 where a telemetry service may receive a data collection policy that includes one or more data collection rules and grammar from a cloud service, a compute device, or an application. In one embodiment, a system-wide data collection policy may be generated by the cloud service or the desktop application to collect data from various sources of a company, business entity, or similar. The telemetry service may proceed to store and manage the data collection policy at block 310.

The method proceeds to block 315 where the telemetry service may decode the data collection rules and grammar which includes parsing the data collection rules and grammar to at least determine collection frequency for a data type. After decoding the collection rules, the telemetry service may determine the system architecture and/or capabilities of one or more devices, subsystems, peripherals, and/or other components for the data collection at block 320. For example, the telemetry service may send an HTTP request to the devices, subsystems, peripherals, and/or other components of the company or business entity, which may respond with their capabilities, version number, and/or other information associated with their system architecture. The information may be used when processing the data collection rules at block 325. For example, the telemetry service may schedule a timer or detect a trigger, such as a free fall event of a disk according to the data collection rules. In another example, processing the data collection rules includes initiating the data collection when a fan speed reaches a certain threshold, when a chassis intrusion is detector, or after a remediation event, such as firmware or software update.

The method proceeds to block 330 where the telemetry service may collect telemetry data based on the collection rules and information based on the system architecture of the devices, subsystems, peripherals, and/or other components. In one particular example, the telemetry service may collect a data type at a frequency based on an interface as shown in table 500 of FIG. 5. The method proceeds to block 335 where the telemetry service may store the telemetry data collected in a local data storage. The data may be labeled prior to storage. For example, the data may include a timestamp and an identifier of its source. The method proceeds to block 340 where the telemetry service may identify a data departure time as defined in the collection of rules. The data departure time may indicate whether the data collection is a periodic event or a one-time event. The method proceeds to block 345 where the telemetry service may transmit the data to a remote data storage location, such as a data lake. Afterwards, the method ends.

FIG. 4 shows a table 400 of a schema of a data collection policy, according to at least one embodiment of the present disclosure. The data collection policy may be a company-wide data collection policy that is created or generated based on the schema, wherein there is one data collection policy for the different sources of data in the company or entity. Table 400 includes one or more columns, such as an identifier 405, a user identifier 410, an installation time 415, a version 420, a time stamp 425, a start time 430, an end time 435, a trigger 440, a payload 445, a checksum 450, and a signature 455. A header 460 of the schema may include identifier 405, user identifier 410, installation time 415, version 420, time stamp 425, start time 430, end time 435, and trigger 440.

Identifier 405 may be a unique identifier for the data collection policy which may be generated when the data policy was created. User identifier 410 may be an identifier generated by a user or an administrator to supplement identifier 405. For example, user identifier 410 may identify the company and/or an information technology center. Installation time 415 may identify when the data collection policy is installed by a telemetry service. Version 420 may define the version of the schema. For example, if the first version of the schema is updated to add another data type, then the schema version is updated. Timestamp 425 may indicate when the data collection policy was created.

Start time 430 and end time 435 may identify a duration of the data collection. For example, the start time may be identified as 9:00 AM while the end time may be identified as 10:00 AM. Accordingly, the duration of the data collection is one hour. During that duration, the data may be collected as defined in the data collection rules. Trigger 440 may identify a trigger method or function for the data collection. A different I/O access method may be used based on the type of interface to read or write the data. Payload 445 may identify an input provided by a user or an application for the data collection policy. An example of payload 445 is shown in table 500 of FIG. 5. Checksum 450 may identify a hash value for the data collection policy that can be used for validation of the integrity of the data collection policy. For example, telemetry service 274 of FIG. 2 may compare the hash value in checksum 450 to a hash value in a data store. Signature 455 may identify a digital signature that can be used by telemetry service 274 of FIG. 2 to authenticate the data collection policy. The schema may be updated and published when there is a change to the system architecture, such as when a data collection interface is added or removed. The updated schema may be used as a basis for generating a new data collection policy or updating the current data collection policy.

FIG. 5 shows table 500 of a payload for a data collection policy, according to at least one embodiment of the present disclosure. The payload includes information associated with the system architecture, as shown in table 500 of FIG. 5. In this example, the payload includes a data type 505, a collection frequency 510, a start time 515, an end time 520, and other factors 525. The information provided by the payload can be used to dynamically optimize data tolerance values, also referred to as data collection frequency. The signature may be a digital certificate used to protect and secure the telemetry data collection process. For example, the data collection grammar that is not signed with a proper signature may not be used to invoke one or more data collection rules. Although depicted to be included with the data collection rules and grammar, the signature may also be in a separate file. The data collection rules and grammar may be installed by the telemetry services of the information handling system by a user or an application, such as application 278.

Data type 505 may indicate a particular data type, also referred to as a data set that may be collected by telemetry service 274 of FIG. 2. The data type may be based on the source of the telemetry data. For example, a battery data type may indicate the type of telemetry data collected from a battery subsystem, such as from a battery management unit. A fan speed data type may indicate the type of telemetry data collected from a fan subsystem. While there are three data types included in table 500, one of ordinary skill in the art would recognize that table 500 would include any suitable number of data types without varying from the scope of this disclosure. Start time 515 and end time 520 may indicate the duration of the collection of a certain data type.

Collection frequency 510 may include collection frequency in seconds for each data type according to an interface type, also referred to as a data collection interface, wherein the interface handles the input and output of data, such as reading and writing the from and to the source. In this example, collection frequency 510 includes an I/O 530, an MMIO 535, an SMI 540, an $I^2C$ 545, an $I^3C$ 550, a configuration channel (CC) 555, and a trust zone (TZ) 560. I/O 530 may indicate a collection frequency for reading or collecting data via an I/O interface, such as a keyboard port. MMIO 535 may indicate a collection frequency for reading or collecting data via an MMIO interface. For example, fan speed data may be collected every 30 seconds with an I/O interface. However, the fan speed data may be collected every 10 seconds with an MMIO interface. SMI 540 may indicate a collection frequency for reading or collecting data via an SMI. I$^2$C 545 may indicate a collection frequency for reading or collecting data via an I$^2$C interface. I$^3$C 550 may indicate a collection frequency for reading or collecting data via an I$^3$C interface. CC 555 may indicate a collection frequency for reading or collecting data via a configuration channel interface. TZ 560 may indicate a collection frequency for reading or collecting certain data via a trust zone interface.

One of skill in the art will appreciate that the basis for collection frequency disclosed herein is applicable to other system architecture factors. In this example, the interface to read or write the data is used as the basis for the collection frequency. However, other basis, such as the type of the device, BIOS version, SoC type, etc. may be used instead of or in combination with the interface.

FIG. 6 shows a table 600 of data collected from a compute device, according to at least one embodiment of the present disclosure. Table 600 includes one or more columns, such as data type 505, data 610, collection frequency 510, an interface 620, and an element 625. Data 610 includes data collected from one or more sources. For example, the compute device where the data was collected from has a first system architecture configuration. The first architecture configuration includes SMI interfaces and an I$^2$C interface. In this example, data associated with fan speed was collected using the SMI interface every 120 seconds.

FIG. 7 shows a table 700 of data collected from a compute device, according to at least one embodiment of the present disclosure. Table 700 includes one or more columns, such as data type 505, data 710, collection frequency 510, an interface 720, and an element 725. For example, the compute device where the data was collected from has a second system architecture configuration. The second architecture configuration includes an I$^3$C interface, an SMI interface, and an I$^2$C interface. In this example, data associated with fan speed was collected using an I$^3$C interface every 20 seconds.

FIG. 8 shows a table 800 of data collected from a compute device, according to at least one embodiment of the present disclosure. Table 800 includes one or more columns, such as data type 505, data 810, collection frequency 510, an interface 820, and an element 825. For example, the compute device where the data was collected from has a third system architecture configuration. The third system architecture configuration includes I/O interfaces and a trust zone interface. In this example, data associated with fan speed was collected using an I/O interface every 30 seconds.

Tables 600, 700, and 800 show data output based on different I/O access methods according to the system architecture of the data source using the same data collection policy. For example, the fan speed data type may be collected using different methods at different frequencies based on the system architecture or the interface used to collect the data. The data collected in tables 600, 700, and 800 may have been collected using the same data collection policy. The data type, collection frequency, and system architecture disclosed herein are examples. One of skill in the art will appreciate that the present disclosure is applicable to other data types, collection frequencies, and system architectures.

As used herein, a hyphenated form of a reference numeral refers to a specific instance of an element and the un-hyphenated form of the reference numeral refers to the collective or generic element. Thus, for example, device "284-1" refers to an instance of a widget class, which may be referred to collectively as devices "284" and any one of which may be referred to generically as a widget "284."

Although FIG. 3 shows example blocks of method 300 in some implementations, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel. For example, blocks 335 and 340 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
receiving, by an information handling system, a data collection policy to collect data from a device, wherein the data collection policy includes data collection grammar of a statement that is used to invoke a data collection rule included in the data collection policy, and wherein the data collection rule and the data collection grammar of the statement were generated for the device;
determining a data collection frequency based on a system platform architecture of the device, a data collection interface to handle input and output of the data, and a data type of the data to be collected according to the data collection policy;
collecting the data based on the data collection frequency associated with the data type of the data, the data collection interface to handle the input and output of the data, and the system platform architecture of the device, wherein the data collection interface is a memory-mapped input/output interface (MMIO); and
transmitting the data to a requesting compute device.

2. The method of claim 1, wherein the data is stored in a local data storage of the requesting compute device.

3. The method of claim 2, further comprising decoding the data collection grammar associated with the data collection rule.

4. The method of claim 3, wherein the data collection grammar is based on a schema.

5. The method of claim 4, further comprising updating the schema of the data collection policy in response to a change in the system platform architecture.

6. The method of claim 1, wherein the data collection policy includes a payload.

7. The method of claim 6, wherein the payload includes a plurality of data collection frequencies associated with a plurality of data types.

8. The method of claim 1, further comprising updating the data collection policy in response to a schema update.

9. An information handling system, comprising:
a memory to store a data collection policy; and
a processor to communicate with the memory, the processor to:
determine a data collection frequency according to the data collection policy, wherein the data collection frequency is based on a data type of data to be collected, a data collection interface to handle input and output of the data, and a system platform architecture of a device, wherein the data collection policy includes data collection grammar of a statement that is used to invoke a data collection rule included in the data collection policy, and wherein the data collection rule and the data collection grammar of the statement were generated for the device;
collect the data from the device according to the data collection frequency associated with the data type of the data, the data collection interface to handle the input and output of the data, and the system platform architecture of the device; and
transmit the data to a requesting information handling system.

10. The information handling system of claim 9, wherein the data collection interface includes a data lane.

11. The information handling system of claim 10, further comprising decoding the data collection grammar associated with the data collection rule.

12. The information handling system of claim 11, wherein the data collection grammar is based on a schema.

13. The information handling system of claim 9, wherein the data collection policy includes a payload.

14. The information handling system of claim 9, wherein the processor is further configured to update the data collection policy in response to a schema update.

15. The information handling system of claim 9, wherein the processor is further configured to update a schema of the data collection policy in response to a change in the data collection interface.

16. A non-transitory computer-readable medium to store instructions that are executable to perform operations comprising:
receiving a data collection policy to collect data from a device;
determining a data collection frequency based on a system platform architecture of the device, a data collection interface to handle input and output of the data, and data type of the data to be collected according to the data collection policy, wherein the data collection policy includes data collection grammar of a statement that is used to invoke a data collection rule included in the data collection policy, and wherein the data collection rule and the data collection grammar of the statement were generated for the device;
collecting the data based on the data collection frequency associated with the data type of the data, the data collection interface to handle the input and output of the data, and the system platform architecture; and
transmitting the data to a requesting application.

17. The non-transitory computer-readable medium of claim 16, wherein the data collection interface includes a control lane.

18. The non-transitory computer-readable medium of claim 17, wherein the operations further comprise decoding the data collection grammar associated with the data collection rule.

19. The non-transitory computer-readable medium of claim 18, wherein the data collection grammar is based on a schema.

20. The non-transitory computer-readable medium of claim 16, wherein the data collection policy includes a payload that includes a plurality of data collection frequencies for a plurality of interfaces.

* * * * *